United States Patent [19]

Liggett

[11] 3,885,048

[45] May 20, 1975

[54] METHOD FOR PREPARING SIMULATED MEAT, FISH AND DAIRY PRODUCTS

[76] Inventor: James J. Liggett, 1203 Fairlane Ave., Libertyville, Ill. 60048

[22] Filed: Sept. 7, 1972

[21] Appl. No.: 286,976

Related U.S. Application Data

[63] Continuation-in-part of Ser. No. 113,637, Feb. 8, 1971, abandoned.

[52] U.S. Cl. .................. 426/18; 426/44; 426/46; 426/802
[51] Int. Cl. ............................................ A23l 1/20
[58] Field of Search .................. 426/18, 44, 46

[56]       References Cited
       UNITED STATES PATENTS
3,243,301    3/1966    Hesseltine et al. .................. 426/18

*Primary Examiner*—James R. Hoffman
*Attorney, Agent, or Firm*—Edmond T. Patnaude

[57]       ABSTRACT

Simulated meat, fish or dairy products are prepared from a fermented vegetable product formed by inoculation of cooked vegetable pieces including soybeans, wheat and sesame with mold spores. The fermented product is mixed with other ingredients including protein additives, flavoring, coloring and texturizers.

10 Claims, No Drawings

METHOD FOR PREPARING SIMULATED MEAT, FISH AND DAIRY PRODUCTS

This application is a continuation-in-part of application Ser. No. 113,637 filed Feb. 8, 1971 and now abandoned.

The present invention generally relates to high protein food products and methods of preparation thereof, and it relates more particularly to a new and improved method of preparing food products which have the flavor, texture and appearance of meat, fish and dairy products.

Vegetables such as legumes and grains have, in the past, been used in the preparation of simulated meat, fish and dairy products. While such products have met with some success they have not experienced widespread acceptance because the flavors of the vegetables have not been entirely eliminated. In the case of simulated meats, the texture as well as the flavor has not been entirely satisfactory. Because, however, of the high protein content of many legumes and grains, it would be desirable to increase the use thereof as human food. Since humans are creatures of habit and are accustomed to acquiring protein from meats, fish and dairy products, it would be desirable to produce from legumes and grains, food products having the appearance, texture and flavor of meat, fish and dairy products.

Therefore, an object of the present invention is to provide a new and improved process for preparing food products from vegetables.

Another object of the present invention is to provide new and improved all-vegetable food products.

A further object of the present invention is to provide a new and improved process for preparing simulated meat, fish and dairy products from vegetable including legumes and gains.

It has been known for many years that when certain vegetable products, such, for example, as soybeans are inoculated with mold spores and cultured or fermented, a bland but yeasty flavored edible product is developed. This product is known as Tempeh and is a staple item of food in certain countries of the world such as Indonesia. I have found that such a food product, while not particularly flavorful, does have a high protein content and does not have a beany flavor.

A still further object of the present invention is to utilize a mold culture to treat legumes and grains and to combine the thus treated product with other ingredients in a novel manner to produce simulated meat products.

Briefly, the above and further objects may be realized in accordance with the present invention by inoculating dehulled, cooked, sterile grains or legumes and sesame seed in whole or flaked form with a mold culture, and then incubating the mixture in a humid atmosphere to ferment it until the vegetables are thoroughly knit together by the fibrous mycelia of the mold culture. This condition is evident by inspection since the interspaces between the vegetable pieces are completely filled with the relatively white mycelia. Seasonings, coloring, texturizing, and vitamin and protein supplements are then mixed with the cultured product prior to packaging and sterilization. The addition of the sesame seeds prior to culturing results in a product having a meaty flavor with nutritional balance. Addition of the sesame after culturing does not provide the meaty flavor, but rather gives a nutty flavor to the product. Where a higher protein content is desired, or where a still stronger meat flavor is needed, the methionine content may be increased by mixing sesame isolate with the main mixture prior to inoculation.

In accordance with one embodiment of the invention, seasonings and coloring are added to the vegetables prior to incubation in a cavity having the shape of the desired end product whereby the flavoring and coloring are enhanced as the mold culture develops. When so processed as described in detail hereinafter, there is provided a product which when cooked has the appearance, texture and flavor of a ground beef patty. Other new and different food products may also be produced by adding seasonings and other ingredients before and-/or during the fermenting process.

Further objects and advantages and a better understanding of the present invention may be had by reference to the following detailed description.

In accordance with the present invention the basic unhulled vegetable ingredients including sesame seeds are cooked as by boiling in water so that the vegetables pieces become saturated with water. With some vegetables, such, for example, as wheat, barley, corn and soybeans, it is desirable to soak the product in water for a few hours prior to cooking. Also, with the harder vegetables such as soya and other dried beans and grains, shorter cooking times and a better final texture is provided by initially splitting or slicing the vegetable before cooking. Soybeans, for example, when split will absorb from about one and one-half to twice their weight in water during such cooking. An aqueous culture of *Rhizopus Oligosporous* or similar organism such as aspergillus, mucor, actinomucor, monascess, saccharomyces, neurospors, acetobacter, bacillus or lactobaccilus is then inoculated into the cooked vegetable pieces and desired flavorings such as cumin, garlic, and onion and colorings may be added at that time. It is important that salt or other minerals which will kill or retard the growth of the mold organisms not be added at this time. The inoculated vegetables may then be placed in thin layers of about ½ to 1-inch thick on trays or in small mold cavities and incubated at a temperature in the range of about 30° to 40°C for about 1 to 3 days until the interspaces between the vegetable pieces are completely filled with the fibrous mycelia of the mold culture. This can readily be determined by inspection of the product during incubation since the mycelia of the mold has a different appearance than the vegetable pieces. When the vegetable pieces have been thoroughly knit together by the mycelia of the mold organisms, the cultured or fermented product is removed from the culture trays or mold cavities, sterilized, packaged and refrigerated.

I have found that rather than seasoning and coloring the product prior to or during culturing it is preferable for certain simulated food items to prepare the cultured vegetable product without using any seasonings or coloring. In this manner, a cultured or fermented base is produced which can be broken or ground up and mixed with other ingredients to prepare a wide variety of different simulated meat, fish and dairy products.

I believe that the meaty flavor results from a synergistic action of the methionine in the sesame seeds with the mold organisms. I have found that the combination of wheat, soybeans and sesame seeds gives a meat flavored, palatable product rich in methionine and lycine without yeasty flavor generally associated with cultured soybean products.

Having described the generic process of the present invention, the following examples will explain in greater detail the particular processes used to prepare simulated meat, fish and dairy products and the additional ingredients used in such products.

EXAMPLE NO. 1 — CULTURED BASE PRODUCT WITH SESAME

A mixture of 50 percent split soybeans, 25 percent flaked sesame meal and 25 percent bulgar wheat is soaked in tap water at 25°C for about 2 hours and then boiled at atmospheric pressure in water for 30 minutes or at 5 p.s.i. for 20 minutes. The mixture is then drained, inoculated with an aqueous solution of Rhizopus Oligosporous and spread out in thin layers about ½-inch thick in sterilized trays and incubated in a humid atmosphere at a temperature of 37°C for 1 day, at which time the fibrous mycelia of the mold will completely fill the interspaces between the vegetable pieces. The cultured product is then broken up and immediately sterilized to kill the mold or is mixed with seasonings, extruded to desired shape and size and then sterilized to stop the mold growth.

In the mixture, sesame isolate may be substituted for the flaked sesame meal. The resulting cultured product will be extremely high in methionine and have a strong meaty flavor which may be diluted with suitable seasonings.

EXAMPLE NO. 2 — SIMULATED MEAT BASE

| | |
|---|---|
| Cultured base product of example 1 | 1000 gms. |
| Hydrolyzed vegetable protein | 25 gms. |
| Garlic Powder | 2 gms. |
| Onion | 1 gm. |
| Monosodium Glutamate ] | 1 gm. |
| (Disodium 5' Inositate and/or) (Disodium 5' Guanylate ) | .1 gm. |
| Salt | 20 gms. |
| Sugar or equivalent amount of artificial sweetener | 5 gms. |

The above listed ingredients in the amounts specified were thoroughly mixed together and extruded into strips ½-inch thick and 3-inches wide. The resulting product was fried and had the appearance, texture, and flavor of meat.

EXAMPLE NO. 3 — SIMULATED CANADIAN BACON

| | |
|---|---|
| Cultured base product of example 1 | 1000 gms. |
| Air classified 2 to 300 mesh hard spring wheat flour | 100 gms. |
| Tapioca, pre-gelatinized | 200 gms. |
| Fumaric acid, dry | 1 gm. |
| Hydrolyzed vegetable protein | 70 gms. |
| Egg White, powdered | 100 gms. |
| Salt | 30 gms. |
| Garlic | 1 gm. |
| All Spice | 5 gms. |
| Sugar | 10 gms. |
| Vegetable fat, melted | 100 gms. |
| Liquid smoke | 10 gms. |
| Coloring as desired | |

The above ingredients, except for the fat, were blended together dry and the melted vegetable fat was then added. Seven-hundred fifty grams of water in which 0.2 percent Potassium Sorbate was dissolved as a preservative was then added and the product was thoroughly blended until smooth. It was then stuffed into edible casings, tied off and pasturized. After pasteurization, it was permitted to cool and then refrigerated. The product had the appearance, taste and texture of Canadian bacon.

EXAMPLE NO. 4 — SIMULATED BEEF JERKY STICK

| | |
|---|---|
| Cultured base product of example 1 | 3.5 lbs. |
| Air classified 2 to 300 mesh hard spring wheat flour | 4 lbs. |
| Powdered Egg White | 1 lb. |
| Hydrolyzed vegetable protein | 1½ lb. |
| Monosodium Glutamate | 2 oz. |
| Powdered Garlic | 2 oz. |
| Salt | 4½ oz. |
| Dextrose | 1 oz. |
| Sodium Caseinate (low flavor) | 8 oz. |
| Pregelatinized tapioca flour | 1.5 lbs. |
| Vegetable fat | 1.5 lbs. |
| Black pepper | .5 oz. |
| Fumaric acid powder | .5 oz. |
| Coloring as desired | |

The dry ingredients were mixed together and the melted vegetable fat was then blended into the mixture. Water was then added to bring the water content of the mixture to about 25 percent. The product was then mixed thoroughly and had a doughy consistency. It was then formed into the desired shape. In one case it was extruded through a circular orifice having a diameter of one-half inch and cut into 12-inch lengths.

Some of these rods were oven cooked for 20 minutes at 200°F., then permitted to cool to room temperature, 70°F., and packaged.

Others of these extruded rods were processed in a microwave oven for 1 minute, removed from the oven and permitted to cool to room temperature before packaging. After processing in a micro-wave oven the product had a particularly chewy and fibrous texture which, I believe, was due to the protein and flavor linkages.

EXAMPLE NO. 5 — SIMULATED SHRIMP

| | |
|---|---|
| Cultured base product of example 1 | 1000 gms. |
| Imitation shrimp flavor | 20 gms. |
| Monosodium Glutamate | 10 gms. |
| Disodium Inositate | .5 gms. |
| Disodium Guanylate | .5 gms. |
| Protein nuggets (70% protein) | 2 lbs. |
| Coloring — Red and yellow as desired | |
| Water | 500 gms. |

The above ingredients except for the cultured base were mixed to form a solution and the cultured base, formed into bite-size, shrimp-shaped pieces, was immersed therein and permitted to soak for 10 minutes. The pieces of the cultured base were then removed, drained and the excess water was squeezed out. The pieces were then packaged and frozen.

After defrosting, the pieces were dipped in an egg batter, french-fried and eaten. In flavor and texture they closely resembled natural shrimp.

EXAMPLE NO. 6 — SOYA MILK

| | |
|---|---|
| Cultured base product of example 1 | 1 lb. |
| Water | 3 lbs. |
| Vegetable fat, melted (hydrogenated coconut oil — 92°m.p.) | 25 gms. |
| Dicalcium phosphate | 5 gms. |
| Maltose or Glucose | 18 gms. |

The cultured base and water are mixed well and the liquid is then separated by centrifuging, filtering or squeezing. The other ingredients are then dissolved in the extracted liquor and the solution is homogenized at 2500 p.s.i. and pasteurized at a temperature, for example, of 160°F. for 30 minutes. After pasteurized the product may be packaged in liquid form or concentrated and spray dried before packaging as powdered milk.

Soya milk prepared in this way has the nutritional value of cow's milk and also has the appearance, taste and mouth feel of cow's milk.

EXAMPLE NO. 7 — SIMULATED CHEESE BACON SPREAD

| | |
|---|---|
| Cultured base product of example 1 | 300 gms. |
| Air classified 2 to 300 mesh hard spring wheat flour | 56.5 gms. |
| Invert sugar syrup | 50 gms. |
| Fumaric acid powder | 3 gms. |
| Salt | 15 gms. |
| Cheddar Cheese powder | 100 gms. |
| Smoke Powder | 3 gms. |
| Garlic Powder | 1 gm. |
| Monosodium Glutamate | 10 gms. |
| Bacon flavor | 3 gms. |
| Coloring — Red Lake Color No. 2 | 3 gms. |
| Coloring — Brown Lake Color | 4 gms. |
| Potassium Sorbate | 1.5 gms. |
| Melted vegetable fat 110°F. M.P. | 450 gms. |

Mix all dry ingredients together, add the ground cultured soybeans and Potassium Sorbate dissolved in 10 grams water, mix well then add the melted fat and mix into a smooth paste.

While the present invention has been described in connection with particular embodiments thereof, it will be understood that many changes and modifications of this invention may be made by those skilled in the art without departing from the true spirit and the scope thereof. Accordingly, the appended claims are intended to cover all such changes and modifications as fall within the true spirit and scope of the present invention.

What is claimed is:

1. A process for making a food product, comprising the steps of cooking a mixture of about 50 percent split soybeans, 25 percent bulgar wheat and 25 percent sesame in the presence of water until the vegetable pieces become saturated with water, inoculating the cooked mixture with an aqueous culture of the group consisting of *Rhizopus Oligosporous*, aspergillus, mucor, actinomucor, monascess, saccharomyces, neurospora, acetobacter, bacillus or lactobacillus, and incubating the inoculated mixture at a temperature exceeding 30°C in an atmosphere sufficiently humid to support mold growth until the spaces between the particles in the mixture are filled with the fibrous mycelia of the mold and the particles are thoroughly knitted together by said mycelia.

2. A process according to claim 1 wherein spices are mixed with the vegetables prior to said incubating step.

3. A process according to claim 1 for making a simulated meat product, comprising the step of mixing with the incubated product, inert-hydrolyzed vegetable protein, seasoning, disodium inositate, or disodium guanylate, salt and a sweetener.

4. A process according to claim 1 for making a simulated beef spread comprising the steps of mixing with the incubated product hydrolyzed vegetable protein, salt, pepper, flour, shortening and coloring, pasteurizing the mixture, and then packaging the pasturized mixture.

5. A process according to claim 1 for making simulated Canadian bacon comprising the steps of blending with the incubated product, flour, tapioca, salt, sugar, and dry seasonings, then adding vegetable fat, coloring, fumaric acid powder, albumen water and a preservative, and thoroughly blending until the mixture is smooth, encasing the smooth mixture in an edible casing, then pasteurizing and cooking the encased product, then permitting the cooked product to cool.

6. A process according to claim 1 comprising the further steps of grinding the fermented mixture, mixing the ground mixture with water, then separating the liquid from the ground mixture, dissolving vegetable fat, and a liquid sweetener in the liquid to form a solution, and homogenizing and then pasteurizing the solution.

7. A process according to claim 6 wherein dicalcium phosphate is dissolved in said liquid before the step of homogenizing.

8. A process according to claim 1 wherein said mold is *Rhizopus Oligosporous*.

9. A process according to claim 1 wherein said sesame is flaked sesame meal.

10. A process according to claim 1 wherein said sesame is sesame isolate.

* * * * *